(12) United States Patent
Araque

(10) Patent No.: US 10,445,814 B2
(45) Date of Patent: Oct. 15, 2019

(54) INTERNATIONAL E-COMMERCE SYSTEM

(71) Applicant: CEA Overseas LLC, Miami, FL (US)

(72) Inventor: Carlos Eduardo Araque, Caracas (VE)

(73) Assignee: Carlos Eduardo Araque, Miami, FL (US)

( * ) Notice: Subject to any disclaimer, the term of this patent is extended or adjusted under 35 U.S.C. 154(b) by 92 days.

(21) Appl. No.: 14/817,769

(22) Filed: Aug. 4, 2015

(65) Prior Publication Data

US 2015/0339760 A1 Nov. 26, 2015

Related U.S. Application Data

(63) Continuation of application No. 13/222,463, filed on Aug. 31, 2011, now abandoned.

(60) Provisional application No. 61/378,648, filed on Aug. 31, 2010.

(51) Int. Cl.
*G06Q 30/06* (2012.01)
*G06Q 20/12* (2012.01)

(52) U.S. Cl.
CPC ......... *G06Q 30/0633* (2013.01); *G06Q 20/12* (2013.01); *G06Q 30/0601* (2013.01); *G06Q 30/0641* (2013.01)

(58) Field of Classification Search
CPC ............... G06Q 30/0633; G06Q 20/12; G06Q 30/0601; G06Q 30/0641
USPC .......................................................... 705/27
See application file for complete search history.

(56) References Cited

U.S. PATENT DOCUMENTS

| 7,013,289 B2* | 3/2006 | Horn | G06Q 10/087 705/14.51 |
| 8,812,396 B2* | 8/2014 | Alba | G06Q 10/0831 705/26.1 |
| 2002/0120527 A1* | 8/2002 | Lam | G06Q 20/12 705/26.61 |
| 2008/0091528 A1* | 4/2008 | Rampell | G06Q 30/0207 705/14.1 |
| 2009/0138379 A1* | 5/2009 | Scheman | G06Q 30/0601 705/26.1 |
| 2009/0271282 A1* | 10/2009 | Pool | G06F 17/2827 705/26.1 |

(Continued)

OTHER PUBLICATIONS

Borck, James R. "Currency Conversion, Fraud Prevention are Hurdles to Successful Global Commerce." InfoWorld 23.6 (2001): 55. ProQuest. May 20, 2019. (Year: 2019).*

*Primary Examiner* — Michael Misiaszek
*Assistant Examiner* — Latasha D Ramphal
(74) *Attorney, Agent, or Firm* — Defillo & Associates; Evelyn A Defilló

(57) ABSTRACT

The present invention is an electronic commerce system that includes a virtual mall server for implementing mirror websites of stores offering products through and affiliated with the virtual mall. The mirrored product data can be viewed by purchasers using a remote computer or wireless device. The system also includes a tariff database including tariff or importation tax information for at least one country. The tariff of tax information is displayed to the user so that the user knows the expense of importing a purchased product into the user's country. The virtual mall server also provides to the user's remote computer real-time information of product price in a currency of choice as well as shipping fee information.

4 Claims, 10 Drawing Sheets

(56) References Cited

U.S. PATENT DOCUMENTS

2013/0218723 A1* 8/2013 Masud ................... G06Q 30/06
705/26.62

* cited by examiner

INTERNATIONAL E-COMMERCE SYSTEM

CROSS REFERENCE TO RELATED APPLICATIONS

This application is a Continuation application of U.S. application Ser. No. 13/222,463 filed Aug. 31, 2011, entitled INTERNATIONAL E-COMMERCE SYSTEM, which claims the benefit of U.S. Provisional Application No. 61/378,648, filed Aug. 31, 2010, the disclosure of both applications is hereby incorporated herein by reference in its entirety.

FIELD OF THE INVENTION

This invention relates to real-time computing systems. Specifically, the invention relates to the application of computing systems to facilitate a currency-blind purchase transaction.

BACKGROUND OF THE INVENTION

Many potential buyers around the world have enough capital to purchase high-end goods or products, but perhaps not enough capital to travel to another country or a major city for access to stores offering such goods or products. The current on-line systems for accessing U.S. high-end products, for example, can also be problematic for additional reasons. First, U.S. companies may not ship goods purchased on-line to foreign countries. Second, even if that were not a problem, most people in the world do not own a credit card or own credit cards that carry a low credit limit.

Thus, there is a need in the art for a truly International e-Commerce system where residents of foreign countries may be able to buy U.S. goods, for example, using their own currency in a currency-blind and real-time transaction, with guaranteed delivery to those foreign countries

SUMMARY OF THE INVENTION

The following presents a simplified summary of the invention in order to provide a basic understanding of some aspects of the invention. This summary is not an extensive overview of the invention. Rather than specifically identify key or critical elements of the invention or to delineate the scope of the invention, its purpose, inter alia, is to present some concepts of the invention in a simplified form as a prelude to the more detailed description that is presented later.

The virtual mall of the present invention may be defined as an International e-commerce system that may be accessed globally. Registered users of the system will have real-time access to all stores affiliated with the virtual mall through the use of websites mirroring the original affiliated stores' websites, thus enabling a seamless and hassle-free shopping experience.

The virtual mall and shipping system of the present invention allows registered users to conduct purchase transactions using local currency in real-time and receive purchased merchandise from anywhere in the world. Thus, the system of the present invention solves at least the problem created by delays in currency conversion or currency fluctuation rates, disparate or non-uniform shipping costs (which will be displayed to the user at the time of product selection or purchase), or custom department issues related to nationalization of products, such as import taxes/tariffs, which are also displayed to the user at the time of purchase or product selection. In one embodiment of the present invention, users may connect with other users through a buyer social network, such as a chat room, integrated with the virtual mall to share the shopping experience, post comments about a product being viewed by users, etc.

In addition, users may pay through a credit card or through a pre-paid card or pre-paid account; in the event the user does not possess a credit card or the cost of a product exceeds that users credit card limit. Also, in the event that the user's credit card limit is exceeded by the product purchase price, the user can pay the remaining balance by depositing money into the pre-paid account.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following description of the invention when considered in conjunction with the drawings.

DESCRIPTION OF ILLUSTRATIVE EMBODIMENTS

Figure 1:
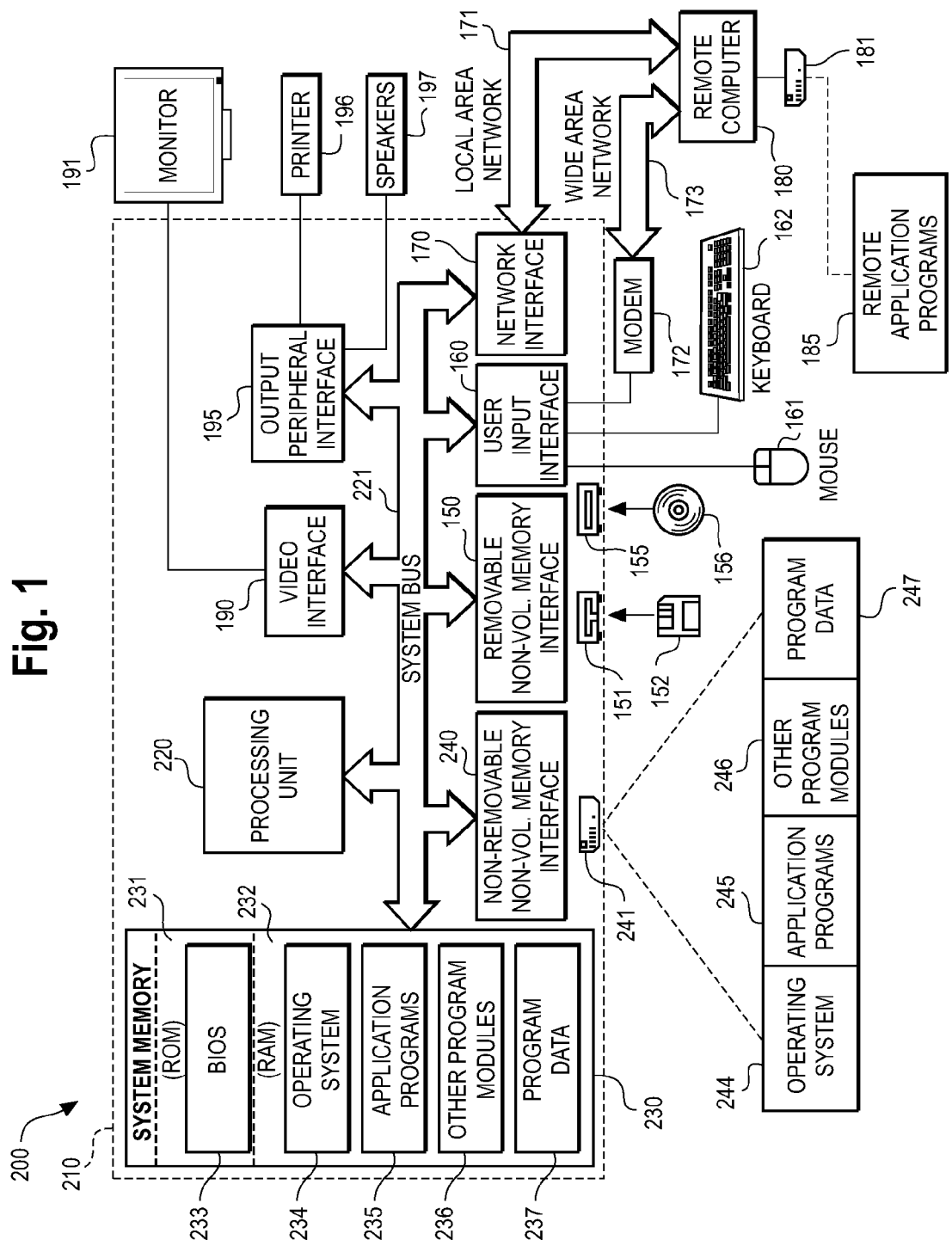
FIG. 1 illustrates an exemplary system that may be used for implementing the invention.

The embodiments described below provide a comprehensive framework for a real-time international e-commerce system, that allows the purchase and delivery of products, any time, from or to anywhere in the world. In an exemplary embodiment, a user in a foreign country may register with the virtual mall system of the present invention to purchase goods from a website which is referred herein as a virtual mall or the GEF mall. This website may be a mirror website of affiliated stores such that the user has the same experience as if he or she had been navigating the original website corresponding to the affiliated store. Affiliated stores may include, for example, Chanel®, Banana Republic®, Macy's®, etc After a user registers with the virtual mall and his/her identity is validated, the user can start surfing the virtual mall and shop for desired brands and/or goods. The virtual mall may mirror the website of an affiliated store or vendor. In a preferred embodiment, the mirror website may display the price of the goods in the user's currency of choice (e.g., local currency). Given the real-time nature of the system of the present invention, the system disclosed herein enables access to the latest and actual inventory of goods available from each vendor. The user can surf from one vendor (affiliated store) mirror site to another within the virtual mall framework and add products to the shopping cart without having to checkout before leaving a mirror site. As the user browses the product selections the user can chat with other registered users online to discuss brands, types of goods, quality, etc. In addition, a user sees the total cost associated with the purchase, including the product cost, shipping cost (international and local), and import taxes/tariffs imposed by the destination country. The tax or tariff information may be retrieved from a central database containing the importation tax or tariff for each destination country.

Once the user adds products from different affiliated stores to a single shopping cart associated with the virtual mall, the user can proceed to checkout. Upon checkout the backend server of the present invention generates a purchase order in real-time for the selected goods, receivable by the affiliated store. The user makes a payment using the users local currency (or of his/her choice), by either using a credit card or a pre-pay account created for the purchase of goods through the virtual mall. A pre-pay account may be opened in any country.

The backend server of the present invention then communicates with a server of the affiliated store to process the payment in real-time in a currency of choice to the affiliated store and to process the delivery of the selected goods to a location or warehouse used for dispatching or exporting the goods to the user in the foreign country. The currency change rate can be calculated by systems known in the art. Illustrative currency exchange systems are disclosed in U.S. Pat. Nos. 7,580,886 and 7,716,109.

In one embodiment, a single warehouse location in the U.S. (e.g., Miami, Fla.) is to receive all orders shipped from the affiliated stores for further delivery or forwarding to the corresponding registered users that have placed the orders. The backend server of the present invention may communicate with the servers of the affiliated stores to obtain a purchase order status update and display the same to users on the virtual mall website. Also, information about expected size and weight of package delivered may also be received from the affiliated store servers or from the shipping company.

As orders are received at the warehouse they are processed based on the order number assigned by the affiliated store and are labeled (the label including the order number) for tracking purposes. The orders can then be grouped based on the country of destination for shipping and according to the shipment method selected by the corresponding user (e.g., air or sea). These constitute consolidated shipments. In one embodiment, instead of a label with a bar code an RFID tag may be attached to the received products for product tracking purposes. In another embodiment both a label and an RFID tag may be used.

Regardless of the number of products and the number of users, consolidated shipments to a particular country are kept by the customs department as they await pickup and processing by a customs broker associated or designated by the virtual mall service operator. The consolidated shipment will include a master label which in turn includes individual label information associated with each product. The master label can be processed by the customs department of that country, assuming the operator of the system of the present invention is a single customer. Thus, the present invention also provides the benefit of simplifying the nationalization process for imported goods The customs broker will have the master label data in advance to facilitate processing. That is, another advantage of the present invention is the reduction in paperwork and delays associated with processing individual orders by a customs agency or department. After the products have been nationalized in the foreign country, the shipment of products to particular users in that country may be outsourced (this fee for this service is included in a total product price displayed to the registered user during the product selection process). Upon delivery, a tracking ticket created by the system of the present invention is closed.

The foregoing description of possible implementations consistent with the present invention does not represent a comprehensive list of all such implementations or all variations of the implementations described. The description of only some implementation should not be construed as an intent to exclude other implementations. Artisans will understand how to implement the invention in many other ways, using equivalents and alternatives that do not depart from the scope of the following claims. Moreover, unless indicated to the contrary in the preceding description, none of the components described in the implementations are essential to the invention Illustrative embodiments of the invention are shown and explained in the figures. Each illustrated module may be implemented as a software module that either fully or partially performs one of the functions described in an illustrated block, or that serves as an interface for exchange of data among such blocks The present invention is generally directed to a system, method, device and computer program product for a real-time international e-commerce system, that allows the purchase and delivery of products, any time, from or to anywhere in the world Accordingly, implementations of the invention include, or involve the use of computing devices.

Specifically, embodiments of present invention may be implemented on one or more computing devices, including one or more servers, one or more client terminals, including computer terminals, a combination thereof, or on any of the myriad of computing devices currently known in the art, including without limitation, personal computers, laptops, notebooks, tablet computers, touch pads (such as the Apple iPad, SmartPad Android tablet, etc.), multi-touch devices, smart phones, personal digital assistants, other multi-function devices, stand-alone kiosks, etc. An exemplary computing device for implementing a computational device is illustrated in FIG. 1.

FIG. 1 illustrates an example of a suitable computing system environment 200 on which features of the invention may be implemented. The computing system environment 200 is only one example of a suitable computing environment and is not intended to suggest any limitation as to the scope of use or functionality of the invention. Neither should the computing environment 200 be interpreted as having any requirement relating to any one or combination of components illustrated in the exemplary operating environment 200.

The invention is operational with numerous other computing system environments or configurations. Examples of well known computing systems, environments, and/or configurations that may be suitable for use with the invention include, but are not limited to, personal computers, server computers, hand-held, notebook or laptop devices, touch pads, multi-touch devices, smart phones, other multi-function devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by one or more computing devices. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system that may be used for implementing the invention includes a computing device 210 which may be used for implementing a server. Components of computing device 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computing device 210 typically includes a variety of computer readable media. Computer readable media may be defined as any available media that may be accessed by computing device 210 and includes both volatile and nonvolatile media, removable and non-removable media. By way of example, and not limitation, computer readable media may include computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computing device 210. Combinations of the any of the above should also be included within the scope of computer readable media.

The system memory 230 may include computer storage media in the form of volatile and/or nonvolatile memory such as read only memory (ROM) 231 and random access memory (RAM) 232. A basic input/output system 233 (BIOS), containing the basic routines that help to transfer information between elements within computing device 210, such as during start-up, is typically stored in ROM 231. RAM 232 typically contains data and/or program modules that are immediately accessible to and/or presently being operated on by processing unit 220. By way of example, and not limitation, FIG. 1 illustrates operating system 234, application programs 235, other program modules 236, and program data 237.

Figure 5:
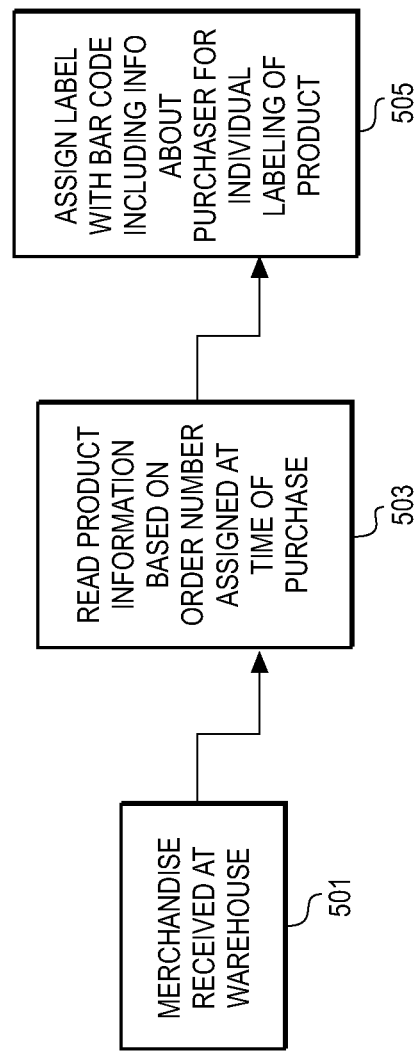
FIG. 5 illustrates a method for electronic processing of merchandise received at a warehouse in accordance with one embodiment of the present invention.

The computing device 210 may also include other removable/non-removable, volatile/nonvolatile computer storage media. By way of example only, FIG. 5 illustrates a hard disk drive 240 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 151 and optical disk drive 155 are typically connected to the system bus 121 by a removable memory interface, such as interface 150.

The drives and their associated computer storage media discussed above provide storage of computer readable instructions, data structures, program modules and other data for the computing device 210. In FIG. 5, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 20 through input devices such as a keyboard 162 and pointing device 161, commonly referred to as a mouse, trackball, touch screen, or multi-touch input device. Other input devices (not shown) may include a microphone, joystick, game pad, satellite dish, scanner, or the like. These and other input devices are often connected to the processing unit 220 through a user input interface 160 that is coupled to the system bus, but may be connected by other interface and bus structures, such as a parallel port, game port or a universal serial bus (USB). A monitor 191 or other type of display device may also be connected to the system bus 221 via an interface, such as a video interface 190. In addition to the monitor, computers may also include other peripheral output devices such as speakers 197 and printer 196, which may be connected through an output peripheral interface 195.

The computing device 210 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computing device 210, although only a memory storage device 181 has been illustrated in FIG. 5. The logical connections depicted in FIG. 5 include a local area network (LAN) 171 and a wide area network (WAN) 173, but may also include other networks. Such networking environments are commonplace in offices, enterprise-wide computer networks, intranets and the Internet.

Figure 2:
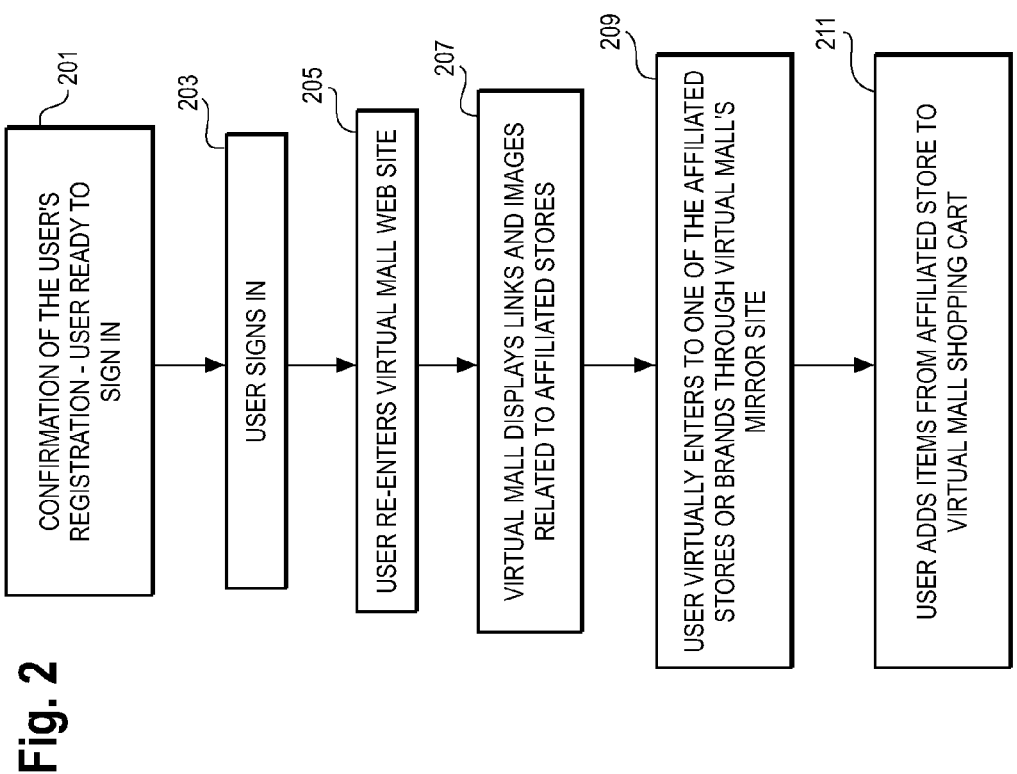
FIG. 2 illustrates a method for processing the addition of product items to a shopping cart in a virtual mall in accordance with one embodiment of the present invention.

When used in a LAN networking environment, the computing device 210 is connected to the LAN 171 through a network interface or adapter 170. When used in a WAN networking environment, the computer 210 typically includes a modem 172 or other means for establishing communications over the WAN 173, such as the Internet. The modem 172, which may be internal or external, may be connected to the system bus 221 via the user input interface 160, or other appropriate mechanism. In a networked environment, program modules depicted relative to the computing device 210, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used FIG. 2 illustrates a method for processing the addition of product items to a shopping cart in a virtual mall in accordance with one embodiment of the present invention. Before a user can use the virtual mall of the present invention, the user preferably creates a user account by registering with the virtual mall operator. The user may register with the virtual mall by providing the following information: user full name, user email address, user country and city, and user date of birth. As part of the registration process the user may indicate whether he or she would you like to receive information about promotions available through the virtual mall.

After the user has registered with the system, the users identity is validated by providing a registered e-mail address or by use of a software module requiring other information for validation as understood by a person of ordinary skill in the art. After registration, the user may receive two e-mails, one welcoming the user to the virtual mall, and explaining the benefits of the international e-commerce system of the invention; and another, where he or she will get the password to log in to the virtual mall.

An encryption key for secure communications may be generated by an automated module, which may change on a per session basis when the user re-enters the virtual mall.

To access mirror websites of the affiliated stores, the user only needs to access the virtual mall directly. In one embodiment of the present invention, these mirror websites do not completely mirror the entire websites of the affiliated stores, but instead may have the look and feel of those affiliated store websites and may include a subset of products available through the original affiliated store websites. To commence the shopping experience through the virtual mall, the user enters his or her email and password. The system of the present invention allows the user to change the password once the user has accessed the virtual mall for the first time. The system of the present invention will handle all encryption keys to assure the customer the protection of his or her password Once the user logs in to the virtual mall, the user will gain access to a list of the categories or products available through the virtual mall, for example: jewelry, women's wear, men's wear, home products, etc. Once the user selects a category, a list of affiliated stores offering such products may be displayed to the user and the user can choose to go into the mirror website of an affiliated store. In one embodiment, the user will see all the stores from the virtual mall and these may be displayed in a format with the look and feel of the affiliated stores. In an alternative embodiment, the virtual mall displays a list of affiliated stores to the user upon entry to the virtual mall.

With specific reference to FIG. 2, in step 201 a user receives confirmation of the users registration and the user is ready to sign in to the virtual mall portal. In step 203 the user signs in and in step 205 the virtual mall portal accepts or validates the user ID. In step 207 the virtual mall displays links and images related to the affiliated stores. In step 209 the user virtually enters to one of the affiliated stores or brands through the virtual mall's mirror site. In step 211 the user adds items from a plurality of affiliated stores to the virtual mall shopping cart.

Figure 3:
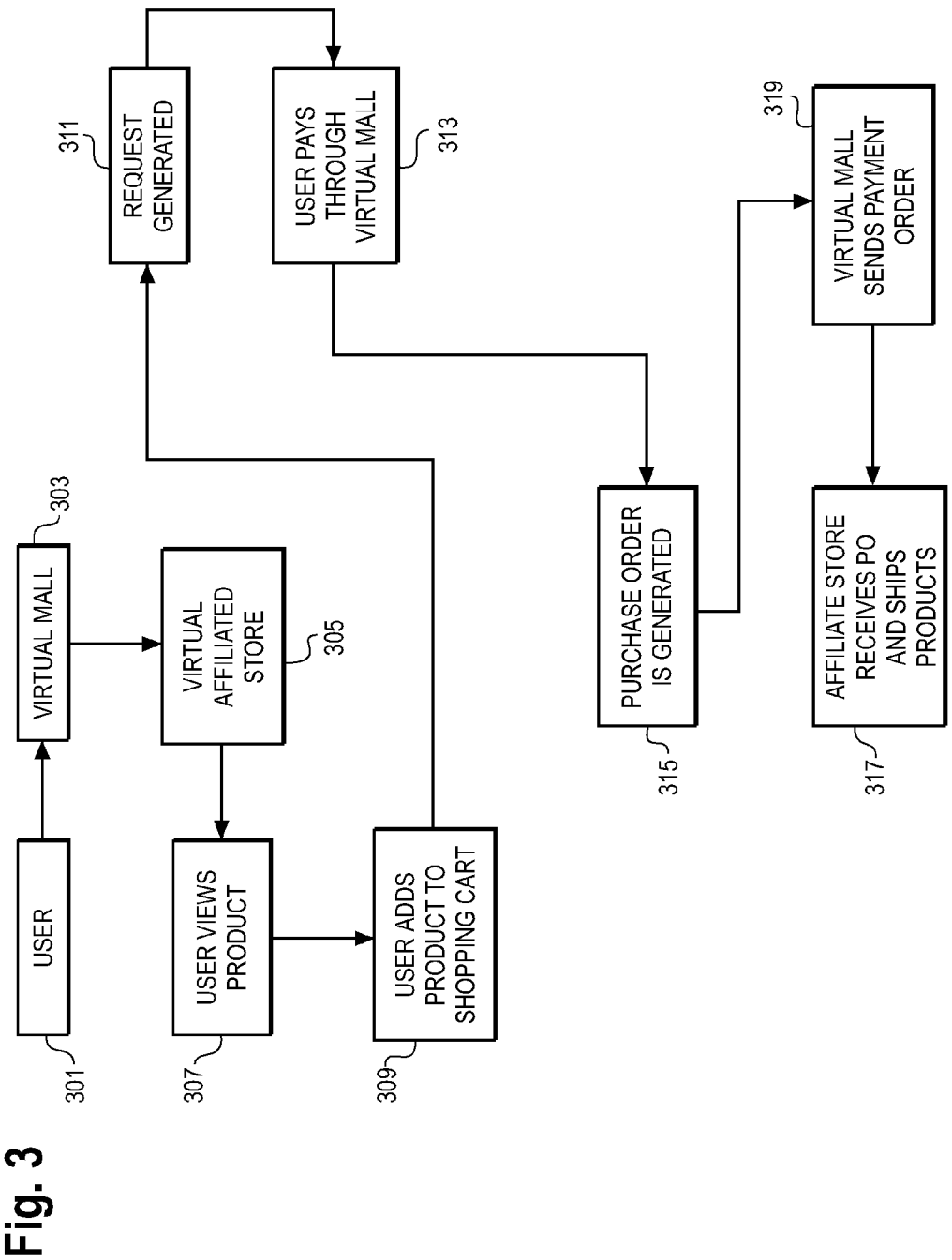
FIG. 3 illustrates a method for processing electronic processing purchase orders in accordance with one embodiment of the present invention.

FIG. 3 illustrates a method for processing electronic processing purchase orders in accordance with one embodiment of the present invention. The user views the products by accessing the affiliated store mirror site through the virtual mall, where the product price is displayed in the currency of the users country. The user may change the country originally selected through the registration process so that the currency information is displayed accordingly.

The user selects the product he or she wants to purchase, which will be added to his shopping cart. When the user selects product from the different stores or brands chosen, the products are added to a single shopping cart. When the user checks out and make a payment, the virtual mall automatically generates purchase orders that are sent to each of the affiliated stores associated with the purchased products.

A software module generates or creates and opens a request to purchase products once the user checks out. In this application the user sees a form where he or she enters a shipping address and contact number. If the user desires to receive items at more than one address, the user may click a button "add another" to enter additional addresses. The system will verify that the data supplied and the user will continue to the next step of the purchase request. The software module then generates a purchase order for each of the affiliated stores and will automatically add through the tab the incremental cost of customs documentation, international taxes and tariffs and national shipping. The shipping costs depend on whether the user chooses air or sea shipping. Finally, the user makes a single payment for all products in the shopping cart from the different affiliated stores. Payments may be made by credit card or pre-paid card or account. A payment module to process payments in real-time for every transaction synchronizes the payment transactions with the system's administrative system to create the purchase orders to the affiliated stores or brands.

With specific reference to FIG. 3, in steps 301-309, the user enters the virtual mall, enters the mirror sites for the affiliated stores, views an selects a number of products from the mirror sites, and adds the products to the virtual mall's shopping cart. In step 311 a request for checkout is generated and in step 313 the user makes a payment for the selected merchandise in the currency of choice. The user at that point had the ability to see product prices displayed in the preferred local currency, depending on the destination country, and also the ability to see the tariff that would be charged for importing the selected product into the destination country.

In step 315 an electronic purchase order is generated for each affiliated store associated with the selected products. For simplicity, FIG. 3 only shows a single affiliated store. In step 319 the virtual mall transmits a payment to the affiliated store in the currency of choice of the affiliated store. This payment only covers the products as the virtual mall operator will forward the tariff and tax amount to the customs broker for make a payment so that the merchandise can be released by the customs department of the destination country. In step 317 the affiliated store processes the electronic purchase order and ships the products to a warehouse.

Figure 4:
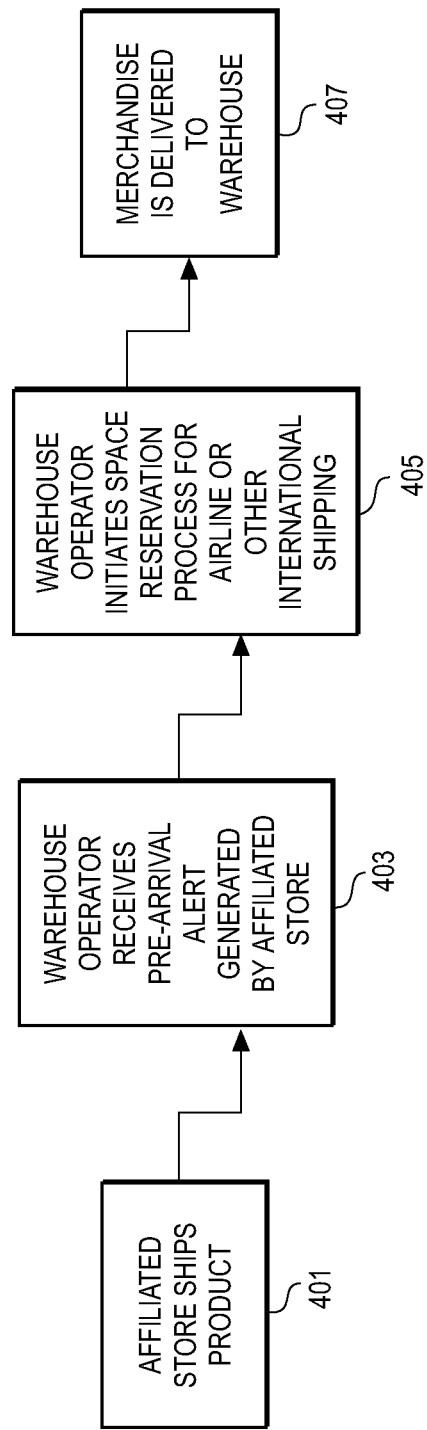
FIG. 4 illustrates a method for operation of a warehouse operation system in accordance with one embodiment of the present invention.

FIG. 4 illustrates a method for operation of a warehouse operation system in accordance with one embodiment of the present invention. A warehouse operations software module receives notifications and updates from the affiliated stores, for example, the status of orders, expected time of shipment, the and the expected time of arrival of the goods to the warehouse.

In the process of releasing purchase orders to affiliated stores or brands, a pre-arrival warning in connection with the expected goods is generated by the affiliated store or shipping company (detailing its size and weight), which drives the space reservation process with an airline or other shipment carrier.

With specific reference to FIG. 4, in step 401 the affiliated store ships the products to the warehouse and also sends a pre-arrival alert (in step 403 the pre-arrival alert is processed by the warehouse computer system) that includes information about the product, for example size of package and international shipping carrier, so that the warehouse computer system or operator in step 405 can initiate reservation process for shipping the products to the destination country. In step 407 the merchandise arrives at the warehouse.

FIG. 5 illustrates a method for electronic processing of merchandise received at a warehouse in accordance with one embodiment of the present invention. When merchandise arrives at the warehouse it is registered through use of a scanner wirelessly connected to a warehouse computer system or an RF ID tag system wirelessly connected to the warehouse computer system. The warehouse computer system updates the status or tracking of the product as each product is entering or moving through the warehouse. An individual product label including a barcode may be generated by using the order number or product ID assigned by the affiliated store or virtual mall at the time of purchase. The individual label or the bar code may include the following information: name of purchaser, purchaser address, destination country, and product information.

With specific reference to FIG. 5, after the merchandise arrives at the warehouse, the product information is processed in step 503 based on the order number assigned by the affiliated store. In one embodiment of the present invention, specific product information, including the order number, is included in the pre-arrival alert so that when the merchandise arrives the warehouse computer system matches the read or scanned product information with the information already received with the pre-arrival alert. In step 505 an individual label with a bar code may be assigned to each individual product. The label or bar code may encode information about the purchaser of the product, the purchaser's address, etc.

Figure 6:
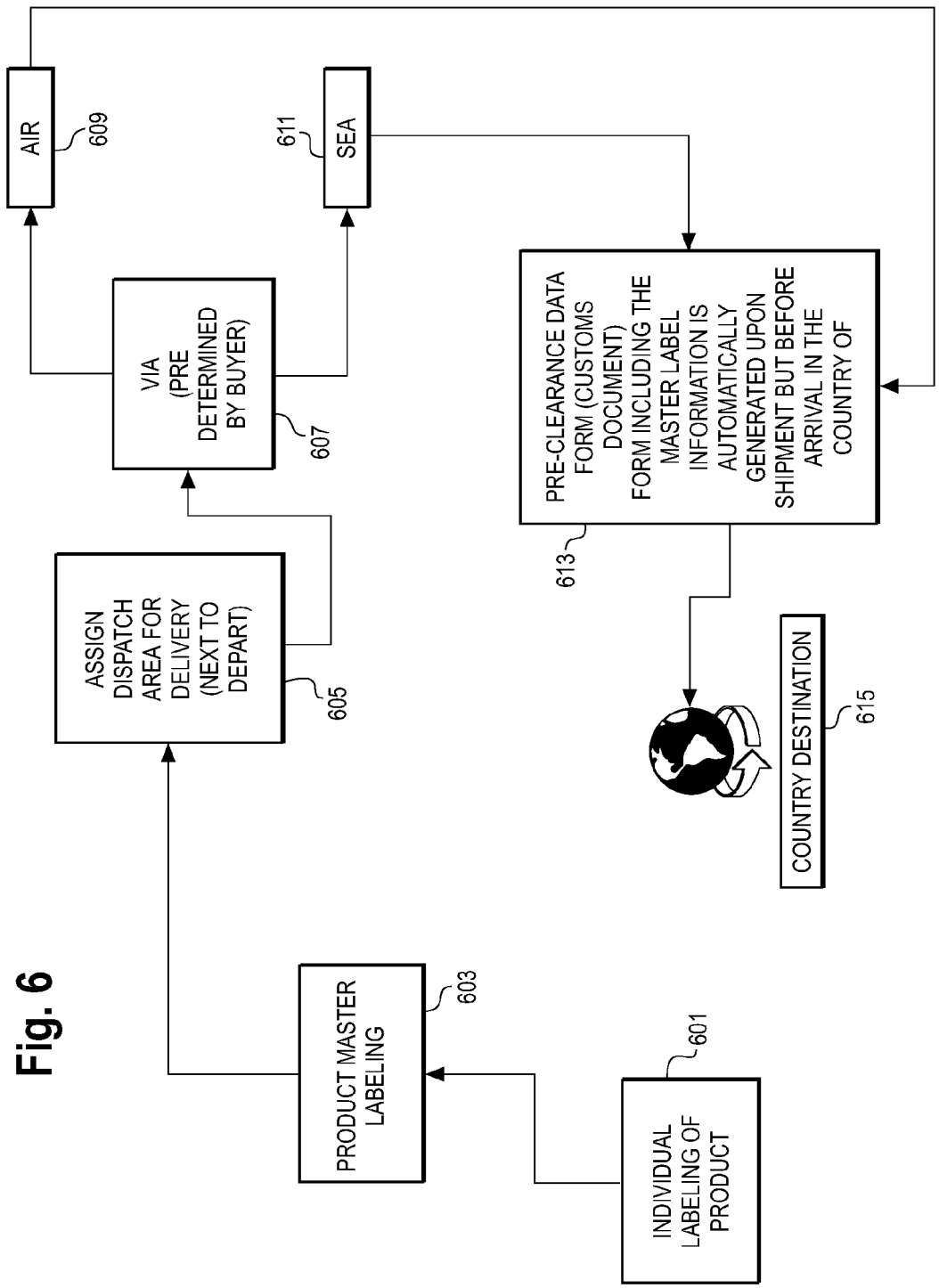
FIG. 6 illustrates a method for processing electronic shipment information in accordance with one embodiment of the present invention.

FIG. 6 illustrates a method for processing electronic shipment information in accordance with one embodiment of the present invention. After labeling each product with the bar code, the product is assigned to a platform or dispatch area office (in physical proximity to the point where the products will be picked up for delivery) according to the shipment method reservation made by the buyer at the time of purchase (air, sea, etc.). Once assigned a dispatch area, the warehouse computer system generates pre-clearance document with data associated with the goods, arriving as a consolidated shipment in the country of destination. To facilitate processing of the consolidated shipment, a master bar code or label may be generated.

With specific reference to FIG. 6, after individual products have been labeled in step 601, products may be grouped together to form consolidated shipments for each destination country, and also grouped by carrier (sea or air, for example). A master label is then created in step 603 for each consolidated shipment. In step 605 each consolidated shipment or package is assigned to a dispatch area close to the physical platform where the consolidated will be picked up, depending on whether the purchaser chose to receive the package by air or sea (numerals 607-611). In step 613 the warehouse computer system generates a customs pre-clearance form populated with information from master labels in the consolidated shipments. The form may not be completely populated, when it is generated by the warehouse computer system, but it is still sent to a customs broker, for example, for completion once the merchandise is processed for release by the customs department at the destination country. Finally, in step 615 the consolidated shipment is sent to the destination country.

Figure 7:
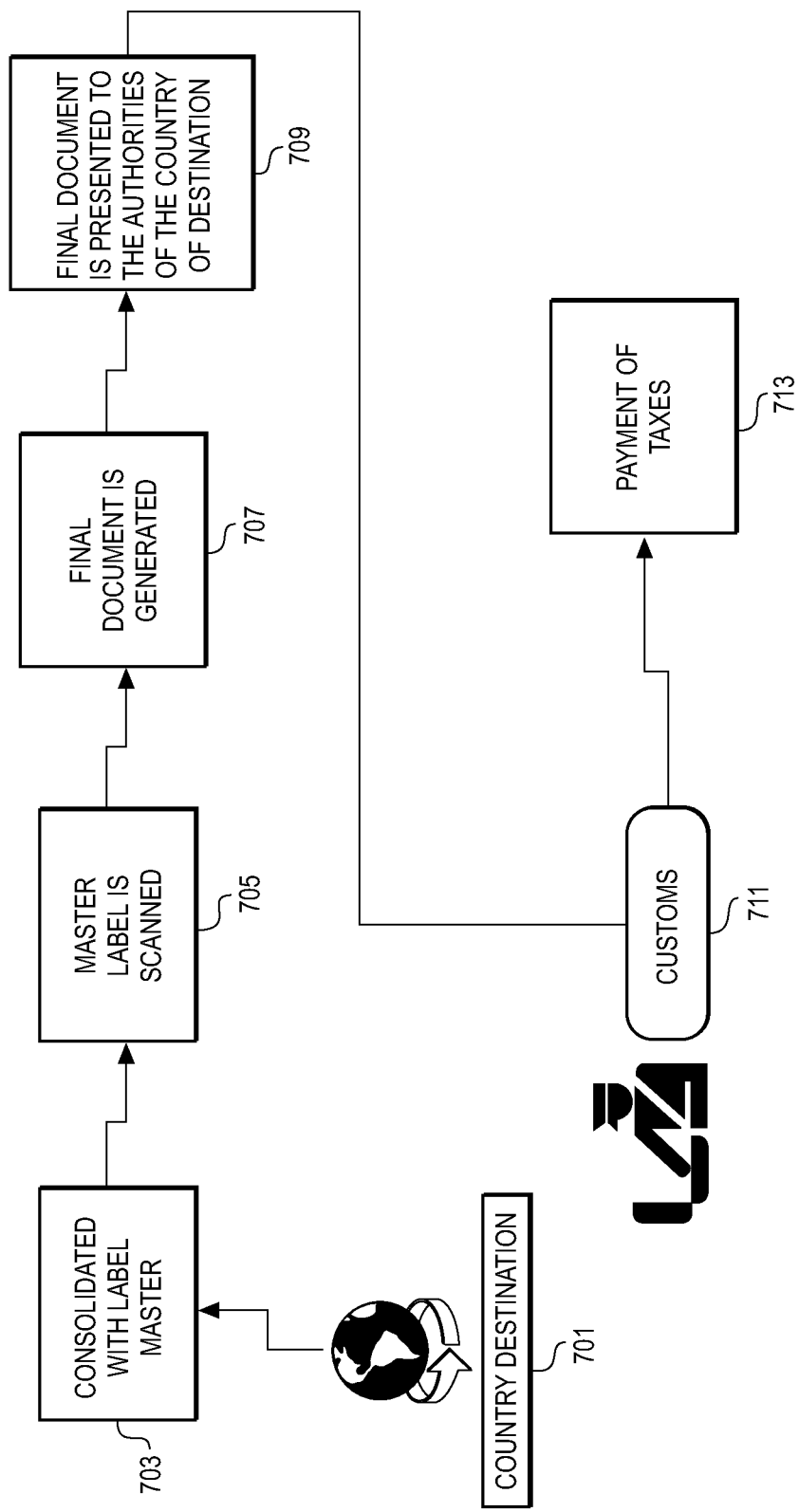
FIG. 7 illustrates a method for processing consolidated shipment information of received shipments in accordance with one embodiment of the present invention

FIG. 7 illustrates a method for processing consolidated shipment information of received shipments in accordance with one embodiment of the present invention. Once the consolidated shipment has arrived through the air, sea, etc. the master bar code from the master label is scanned in the destination country and the customs declaration is automatically generated by populating fields left blank in pre-clearance form. A customs broker that may act on behalf of the warehouse operator or virtual mall operator may present the required documentation to the customs authorities before customs can release the received consolidated shipment. The customs broker may also request electronic processing of the taxes or tariffs required for release of the consolidated shipment.

With specific reference to FIG. 7, after a consolidated package is received at the destination country 701, the customs department or customs broker may access the master label 703 and then scan the same 705 to retrieve information about the products such that the pre-clearance form can be completed and a final customs release document is generated 707. In one embodiment the customs broker may use a smart scanner that sends a communication back to the warehouse computer system or the virtual mall server to notify that a consolidated shipment has arrived at the destination country. The final release document may be delivered to the proper officials 709 and/or to customs 711. The products are released upon payment of importation taxes or tariffs 711 (801 in FIG. 8).

Figure 8:
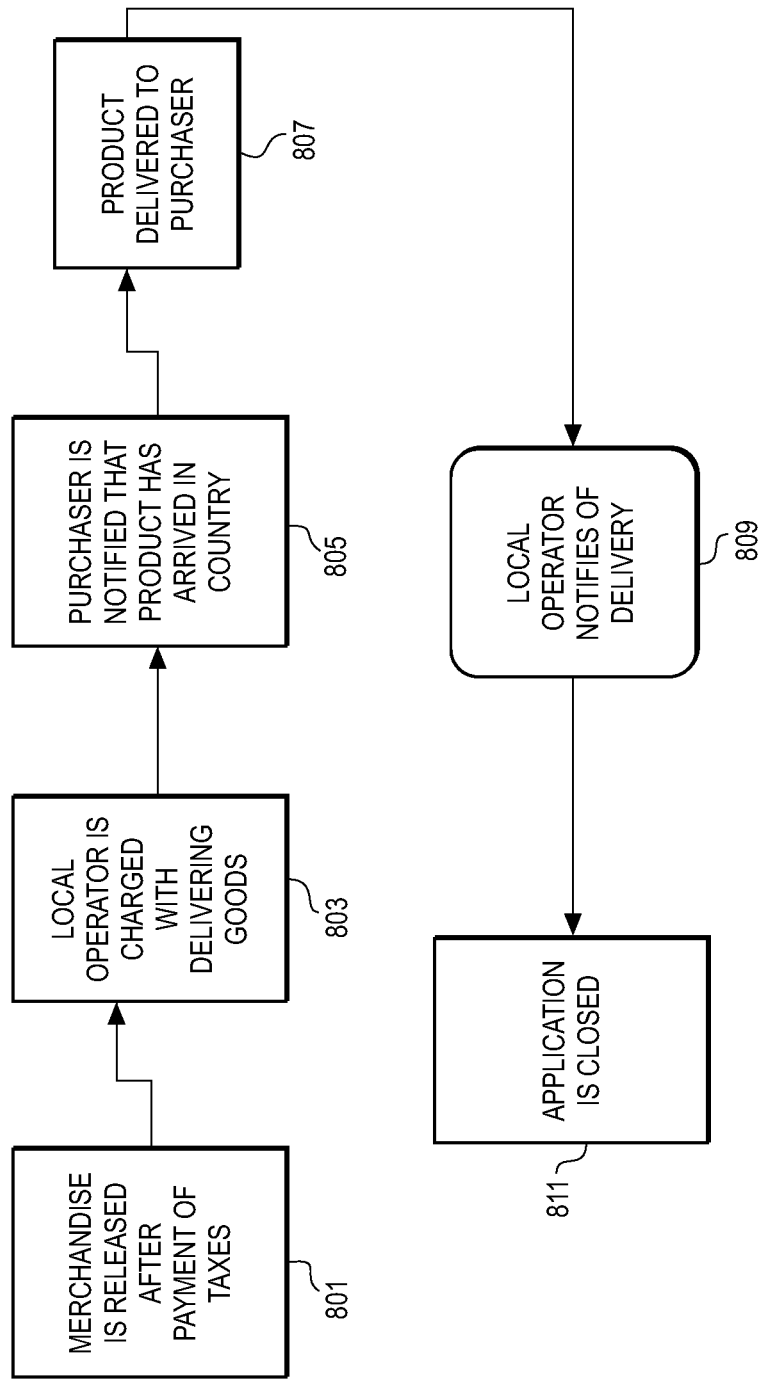
FIG. 8 illustrates a method for electronic processing of merchandise delivery to purchaser in accordance with one embodiment of the present invention.

FIG. 8 illustrates a method for electronic processing of merchandise delivery to purchaser in accordance with one embodiment of the present invention.

Once a consolidated shipment is released by customs, it may be distributed to the individual customers by a local delivery operator: FEDEX®, UPS®, DHL®, etc. Once the product is picked up by the local shipping company the user is notified via email. The operator of the virtual mall or the warehouse if notified once the carrier has delivered the products to the customers.

With specific reference to FIG. 8, after the merchandise is released by the destination country's authorities, a local operator pre-approved by the warehouse operator or the virtual mall operator is to deliver the specific products to the purchasers that placed the orders using the virtual mall 803. Before receiving the product, the purchaser is alerted that a product has arrived in the destination country (step 805) by the warehouse computer system or the virtual mall server. In step 807, the product is delivered to the purchaser and upon delivery the local operator in step 809 sends an electronic notification to the warehouse computer and/or to the virtual mall server confirming that the product has been delivered. In step 811 the warehouse operator and/or the virtual mall server close the order ticket or application associated with the delivered products.

Figure 9:
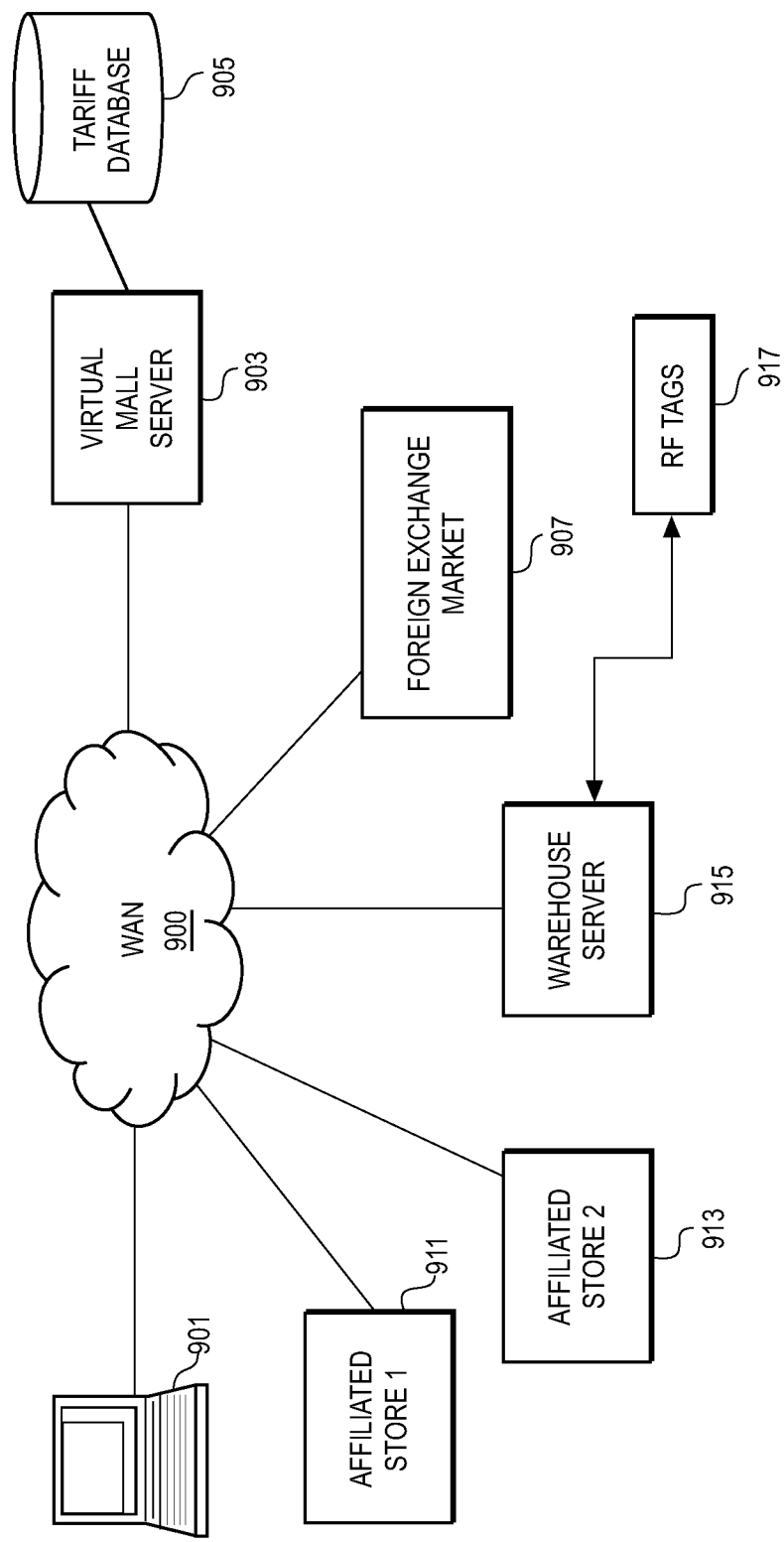
FIG. 9 illustrates one embodiment of the e-commerce system of the present invention.

FIG. 9 illustrates one embodiment of the e-commerce system of the present invention. The system may include an end-users computer 901 for navigating the virtual mall being operated by the server 903 through use of a WAN 900 such as the Internet. The user has access to products from affiliated stores 911 and 913 available through the virtual mall server 903. To enable that feature the server 903 may implement mirror sites that reflect the websites from affiliated stores 911 and 913. In one embodiment of the present invention, the data corresponding to the mirror sites may reside at the server 903 or may reside on a database associated with the server 903 and may be updated periodically.

The foreign exchange market computer 907 may provide to the virtual mall server 903 real-time information related to currency conversions so that the product prices supplied by the affiliated stores can be converted by the virtual mall server into a currency of choice for the end-users. The price of the products in the currency of choice may be displayed to the user as the user searches the mirror sites for products. The user can also view in real-time the information about the tariff or tax that would have to be paid for importing the product into the destination country. This information may be maintained by the virtual mall operator in a tariff database 905. The user may also select a shipping carrier (for example, air or sea). The shipping cost may be calculated based on the shipping fee that the affiliated store would charge for shipping the products to the warehouse in addition to the cost of shipping the product from the warehouse to the destination country Once products are in route to the warehouse, the affiliated stores 911 and 913 may send a pre-arrival alert to the warehouse computer system 915. Upon receipt of the shipped products, the products are labeled with a bar code or RF tags 917 may be attached to the products to facilitate keeping track of the products as they are moved around in the warehouse.

Figure 10:
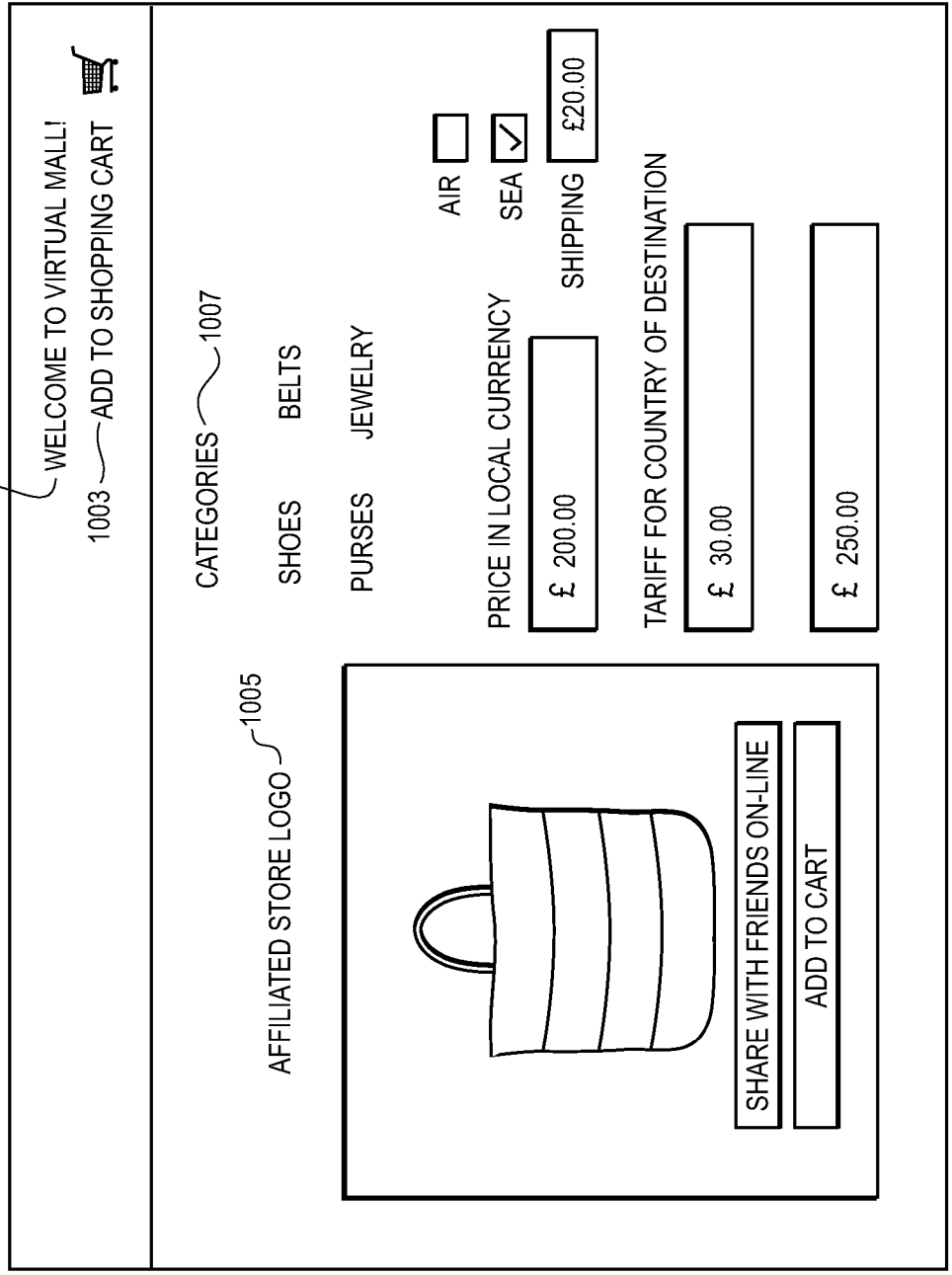
FIG. 10 illustrates an exemplary screenshot of the virtual mall portal in accordance with one embodiment of the present invention.

FIG. 10 illustrates an exemplary screenshot of the virtual mall portal in accordance with one embodiment of the present invention. The user interface may include a Welcome message from the virtual mall operator 1001, as well as a shopping cart 1003 associated with the virtual mall, so that purchases for products of the affiliated stores can be added to a single cart. In the illustrated embodiment, the user can view a list of product categories 1007 for the affiliated store as well as the logo or brandname of the affiliated store 1005 such that the accessed morrow site has the "look and feel" of the original affiliated store website. In FIG. 10 the user is viewing a purse and in the window that the purse is displayed the user is presented with a button that would allow the user to share comments or solicit opinions about the product, via chat, social network, etc., with other friends or users that are on-line, for example. In the illustrated embodiment the user has selected a "sea" carrier for shipping the product to the destination country. The illustrated embodiment also shows that the user is presented with the product price, shipping fee, and importation tariff, all in a currency of choice.

The foregoing description of possible implementations consistent with the present invention does not represent a comprehensive list of all such implementations or all variations of the implementations described. The description of only some implementation should not be construed as an intent to exclude other implementations. Artisans will understand how to implement the invention in many other ways, using equivalents and alternatives that do not depart from the scope of the invention. Moreover, unless indicated to the contrary in the preceding description, none of the components described in the implementations are essential to the invention.

What is claimed is:

1. An electronic commerce system comprising:
a virtual mall server configured to operate a virtual mall on a virtual mall website, wherein the virtual mall includes an electronic shopping cart;
an electronic device configured to provide a user access to products from a plurality of affiliated store sites through the virtual mall website by registering with the virtual mall;
a plurality of mirror websites implemented by the virtual mall server and accessible through the virtual mall;
wherein, each mirror website is displayed in a format with a look and feel of a separate one of the plurality of the affiliated store sites and includes products available through the separate one of the plurality of the affiliated store sites;
wherein the virtual mall is configured to enable the user to add products from any of the plurality of the mirror websites to the electronic shopping cart without having to navigate away from the mirror website;
a foreign exchange market computer coupled to the virtual mall server, the foreign exchange market computer configured to: converts prices on a currently browsed mirror website to a single currency selected by the user;
a tariff database of the virtual mall server that includes taxes and shipping costs for the products from the mirror website for at least one country, wherein the tariff database provides the taxes and the shipping costs for products displayed on the mirror websites based on at least one country selected by the user;
displaying, by the virtual mall server, taxes and shipping costs in the single currency for products displayed on the mirror websites based on the at least one country selected by the user;
a back-end server coupled to the virtual mall server and a corresponding affiliated store server, the back-end server is configured to:
receive products from the mirror websites that the user added to the electronic shopping cart;
generates a purchase order for each of the affiliated store sites from which each of received products is available, based on which of the mirror sites the product was added to the electronic shopping cart from;
send payment in the single currency for each purchase order to the corresponding affiliated store server;
process the payment in a currency based on the affiliated store sites for the purchase order and
process delivery of shipments of products that the user purchased to a warehouse location;
a warehouse computer coupled to to the virtual mall server, the warehouse computer configured to:
generate main labels based on information related to the purchase order for each one of the shipments of the products that the user purchased that is shipped to the warehouse location;
generate pre-clearance customs documents based on the information related to the purchase order;

send the pre-clearance customs documents electronically to a customs computer.

2. The electronic commerce system according to claim 1, wherein the the user registered with the virtual mall chats with a plurality of other users registered with the virtual mall.

3. A computer implemented method comprising:
a virtual mall server configured to operate a virtual mall on a virtual mall website, wherein the virtual mall includes an electronic shopping cart;
an electronic device configured to provide a user access to products from a plurality of affiliated store sites through the virtual mall website by registering with the virtual mall;
a plurality of mirror websites implemented by the virtual mall server and accessible through the virtual mall;
wherein, each mirror website is displayed in a format with a look and feel of a separate one of the plurality of the affiliated store sites and includes products available through the separate one of the plurality of the affiliated store sites;
wherein the virtual mall is configured to enable the user to add products from any of the plurality of the mirror websites to the electronic shopping cart without having to navigate away from the mirror website;
a foreign exchange market computer coupled to the virtual mall server, the foreign exchange market computer configured to convert prices on a currently browsed mirror website to a single currency selected by the user;
a tariff database of the virtual mall server that includes taxes and shipping costs for the products from the mirror website for at least one country, wherein the tariff database provides the taxes and the shipping costs for products displayed on the mirror websites based on at least one country selected by the user;
displaying, by the virtual mall server, taxes and shipping costs in the single currency for products displayed on the mirror websites based on the at least one country selected by the user;
a back-end server coupled to the virtual mall server and a corresponding affiliated store server, the back-end server is configured to:
receive products from the mirror websites that the user added to the electronic shopping cart;
generate a purchase order for each of the affiliated store sites from which each of received products is available, based on which of the mirror sites the product was added to the electronic shopping cart from;
send payment in the single currency for each purchase order to the corresponding affiliated store server;
process the payment in a currency based on the affiliated store sites for the purchase order; and
process delivery of shipments of products that the user purchased to a warehouse location;
a warehouse computer coupled to the virtual mall server, the warehouse computer configured to:
generate main labels based on information related to the purchase order for each one of the shipments of the products that the user purchased that is shipped to the warehouse location;
generate pre-clearance customs documents based on the information related to the purchase order;
send the pre-clearance customs documents electronically to a customs computer.

4. The computer-implemented method according to claim 3, wherein the main labels are RFID tags.

* * * * *